(12) United States Patent
Hulsing, II

(10) Patent No.: US 6,282,955 B1
(45) Date of Patent: *Sep. 4, 2001

(54) LOW VIBRATION LINK

(75) Inventor: Rand H. Hulsing, II, Redmond, WA (US)

(73) Assignee: L-3 Communications Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/562,266

(22) Filed: Apr. 29, 2000

Related U.S. Application Data

(62) Division of application No. 09/016,186, filed on Jan. 30, 1998, now Pat. No. 6,098,462, which is a continuation of application No. 08/893,721, filed on Jul. 11, 1997, now Pat. No. 6,023,972, which is a division of application No. 08/786,185, filed on Jan. 20, 1997, now Pat. No. 5,920,011, which is a division of application No. 08/522,812, filed on Sep. 1, 1995, now Pat. No. 5,627,314, which is a division of application No. 08/207,328, filed on Mar. 7, 1994, now Pat. No. 5,557,046, which is a division of application No. 08/073,818, filed on Jun. 8, 1993, now Pat. No. 5,331,854, which is a division of application No. 07/653,533, filed on Feb. 8, 1991, now Pat. No. 5,241,861.

(51) Int. Cl.$^7$ .................................................. G01P 9/04
(52) U.S. Cl. .................................. 73/504.04; 73/504.12
(58) Field of Search .......................... 73/504.04, 504.12, 73/504.14, 504.15, 504.16, 510

(56) References Cited

U.S. PATENT DOCUMENTS

| | | | |
|---|---|---|---|
| 5,319,976 | * | 6/1994 | Hulsing, II .................. 73/504.12 |
| 5,341,682 | * | 8/1994 | Hulsing, II .................. 73/504.04 |
| 5,627,314 | * | 5/1997 | Hulsing, II .................. 73/504.04 |
| 6,079,271 | * | 6/2000 | Hulsing, II .................. 73/504.04 |

* cited by examiner

*Primary Examiner*—Helen Kwok
(74) *Attorney, Agent, or Firm*—Winston & Strawn

(57) ABSTRACT

A symmetrical link device for linking first and second coplanar devices each movably mounted in a frame such that when one of the first and second coplanar devices is moved, a substantially equal and opposite motion is imparted to the other of the first and second coplanar devices.

1 Claim, 7 Drawing Sheets

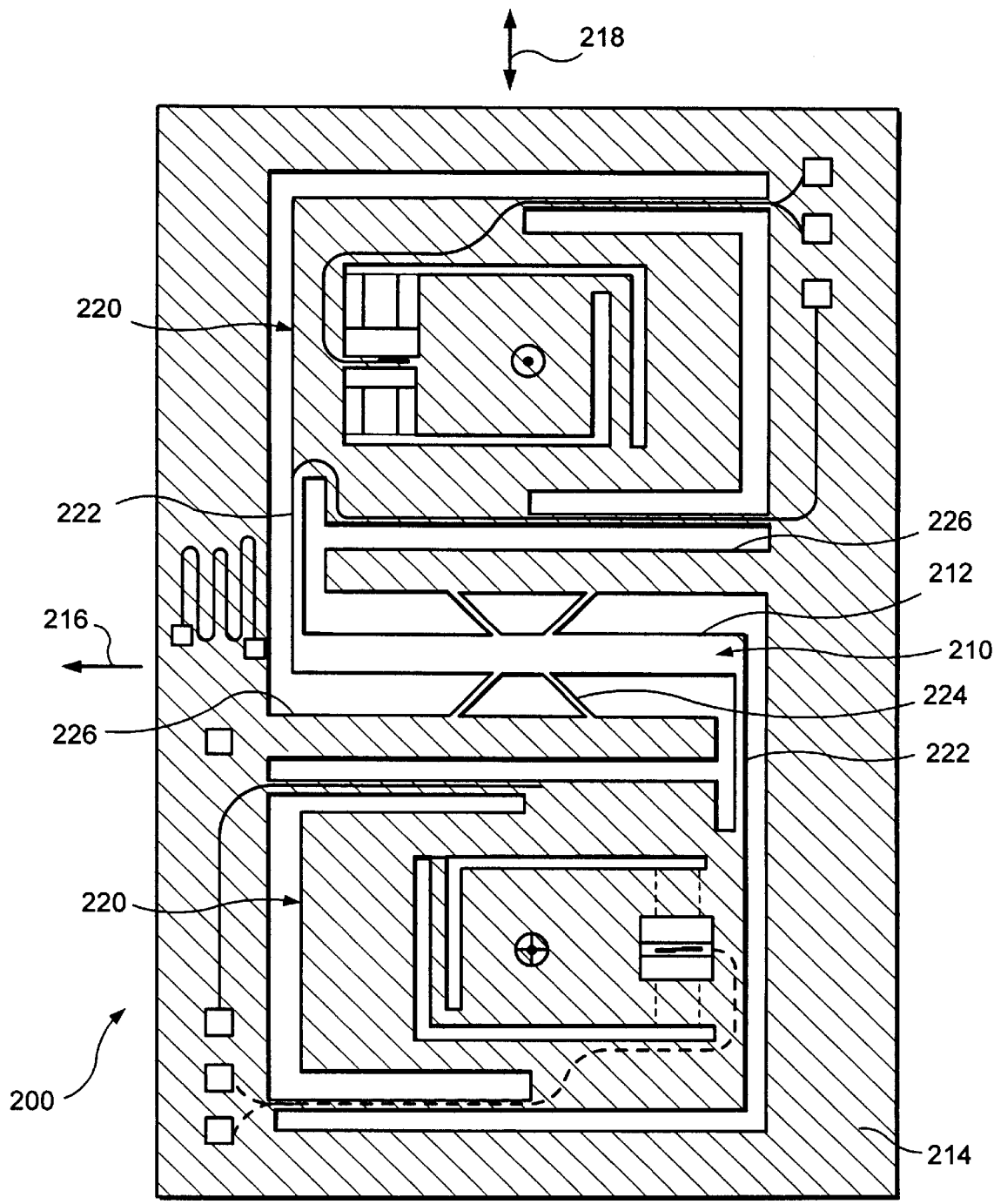
F I G. 2

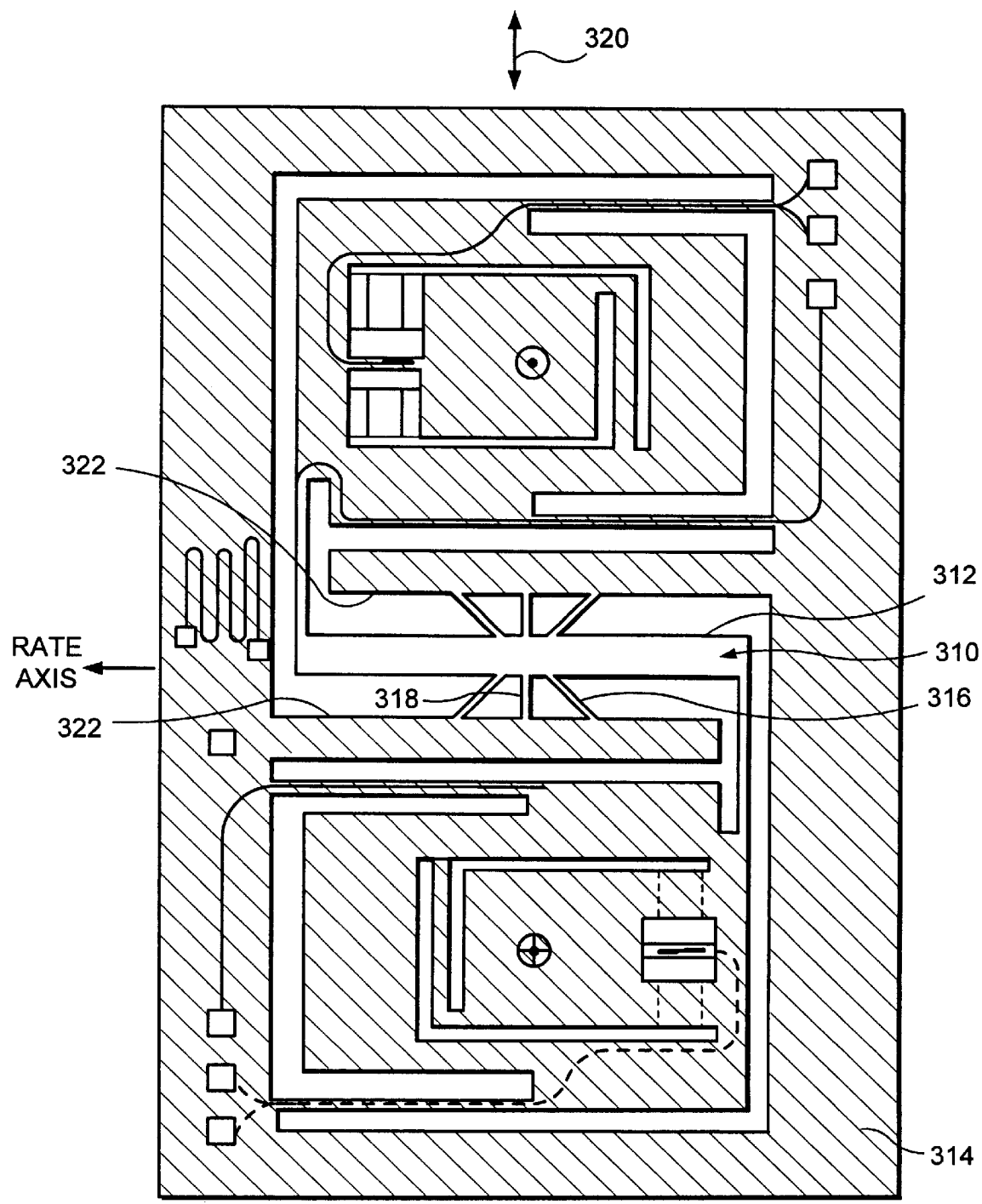
F I G. 3

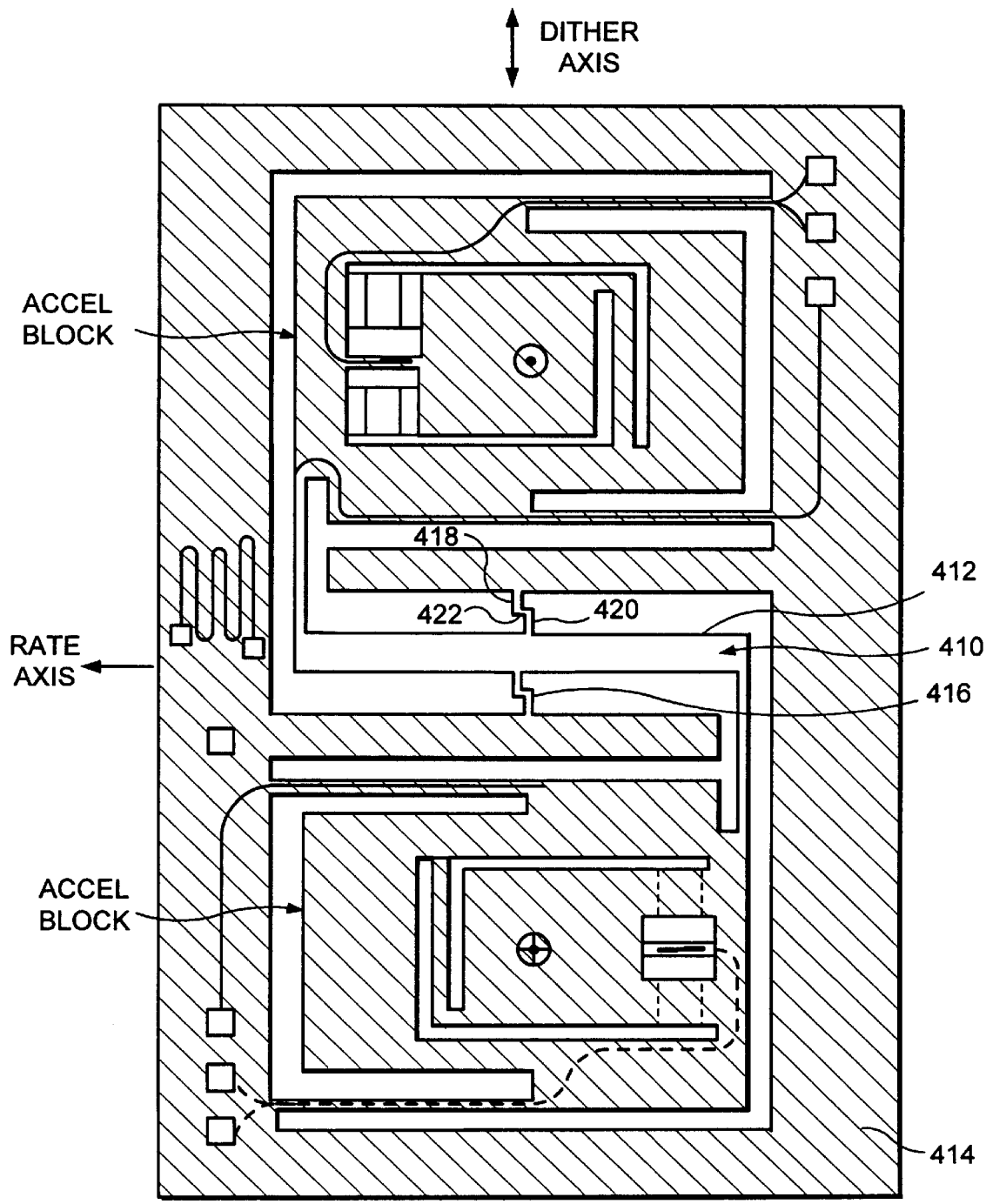
F I G. 4

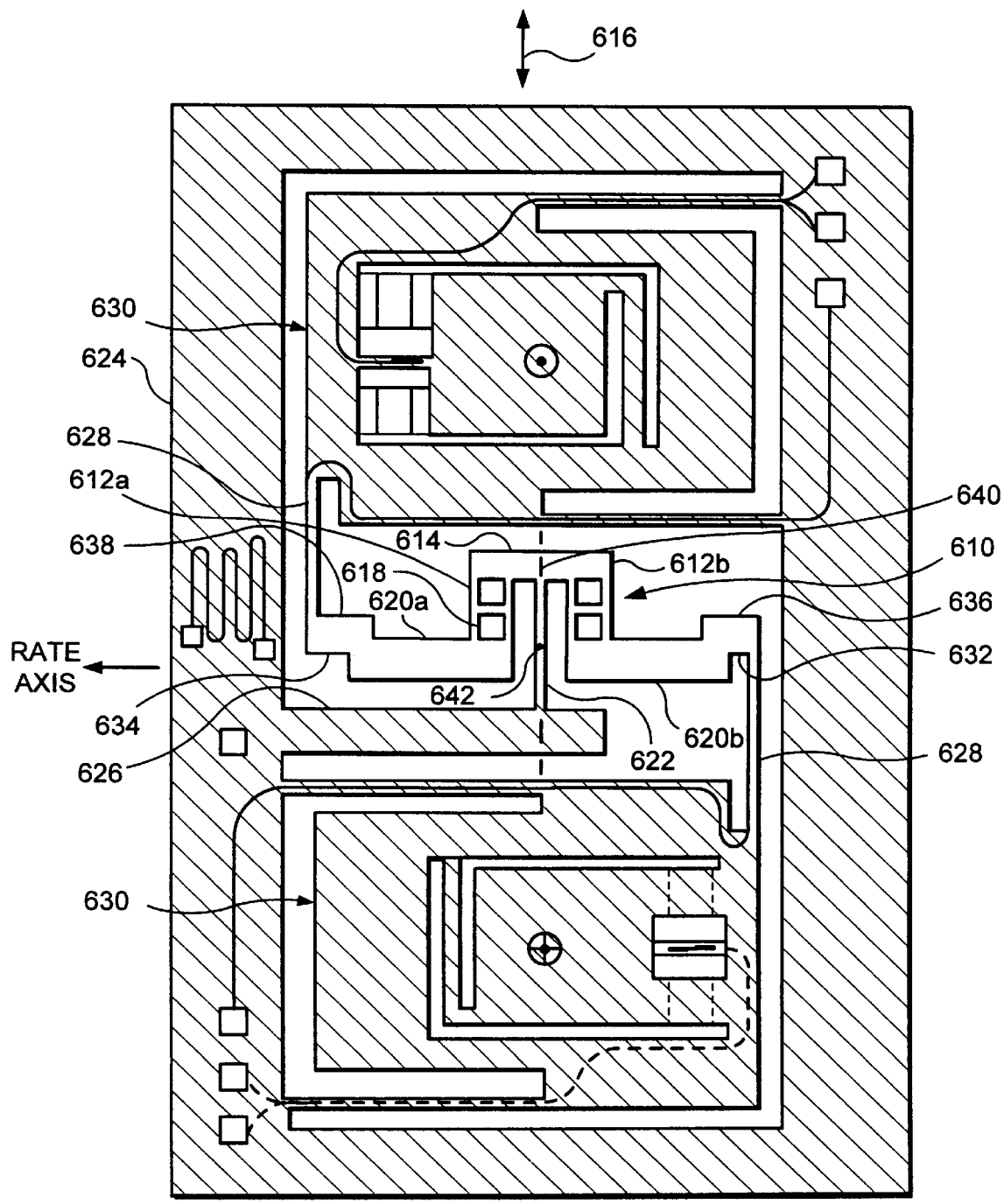
F I G. 6

LOW VIBRATION LINK

This is a Divisional of U.S. application Ser. No. 09/016,186, filed Jan. 30, 1998, now U.S. Pat. No. 6,098,462, which is a Continuation of U.S. application Ser. No. 08/893,721, filed Jul. 11, 1997, now U.S. Pat. No. 6,023,972, which is a Divisional of U.S. application Ser. No. 08/786,185, filed Jan. 20, 1997, now U.S. Pat. No. 5,920,011, which is a Divisional of U.S. application Ser. No. 08/522,812, filed Sep. 1, 1995, now U.S. Pat. No. 5,627,314, which is a Divisional of U.S. application Ser. No. 08/207,328, filed Mar. 7, 1994, now U.S. Pat. No. 5,557,046, which is a Divisional of U.S. application Ser. No. 08/073,818, filed Jun. 8, 1993, now U.S. Pat. No. 5,331,854, which is a Divisional of U.S. application Ser. No. 07/653,533, filed Feb. 8, 1991, now U.S. Pat. No. 5,241,861.

FIELD OF THE INVENTION

The invention relates to linkages, in particular to linkages formed between accelerometers in rate sensors.

REFERENCE TO RELATED APPLICATIONS

Reference is made to the following commonly assigned patents:
1) entitled "Monolithic Accelerometer," U.S. Pat. No. 5,165,279 issued on Nov. 24, 1992, in the name of Brian L. Norling;
2) entitled "Accelerometer With Co-Planar Push-Pull Force Transducers," U.S. Pat. No. 5,005,413 issued on Apr. 9, 1991, in the name of Mitch Novack;
3) entitled "Coriolis Inertial Rate and Acceleration Sensor," U.S. Pat. No. 5,168,756 issued on Dec. 8, 1992, in the name of Rand H. Hulsing II;
4) entitled "Torque Coil Stress Isolator," U.S. Pat. No. 5,111,694 issued on May 12, 1992, in the name of Steven Foote;
5) entitled "Micromachined Rate And Acceleration Sensor," U.S. Pat. No. 5,627,314 issued on May 6, 1997, in the name of Rand H. Hulsing II;
6) entitled "Micromachined Rate And Acceleration Sensor," U.S. Pat. No. 5,557,046 issued on Sep. 17, 1996, in the name of Rand H. Hulsing II;
7) entitled "Micromachined Rate And Acceleration Sensor Having Vibrating Beams," U.S. Pat. No. 5,331,854 issued on Jul. 26, 1994, in the name of Rand H. Hulsing II;
8) entitled "Micromachined Rate And Acceleration Sensor," U.S. Pat. No. 5,241,861 issued on Sep. 7, 1993, in the name of Rand H. Hulsing II;
9) entitled "Micromachined Rate And Acceleration Sensor," U.S. application Ser. No. 08/893,721 filed Jul. 11, 1997, in the name of Rand H. Hulsing I-I; and
10) entitled "Micromachined Rate And Acceleration Sensor," U.S. application Ser. No. 08/786,185 filed Jan. 20, 1997, in the name of Rand H. Hulsing II
all of which are incorporated herein by reference.

BACKGROUND OF THE INVENTION

The rate of rotation of a moving body about an axis may be determined by mounting an accelerometer on a frame and dithering it, with the accelerometer's sensitive axis and the direction of motion of the frame both normal to the rate axis about which rotation is to be measured. For example, consider a set of orthogonal axes X, Y and Z oriented with respect to the moving body. Periodic movement of the accelerometer along the Y axis of the moving body with its sensitive axis aligned with the Z axis results in the accelerometer experiencing a Coriolis acceleration directed along the Z axis as the moving body rotates about the X axis. A Coriolis acceleration is that perpendicular acceleration developed while the body is moving in a straight line, while the frame on which it is mounted rotates. This acceleration acting on the accelerometer is proportional to the velocity of the moving sensor body along the Y axis and its angular rate of rotation about the X axis. An output signal from the accelerometer thus includes a DC or slowly changing component or force signal F representing the linear acceleration of the body along the Z axis, and a periodic component or rotational signal $\Omega$ representing the Coriolis acceleration resulting from rotation of the body about the X axis.

The amplitude of that Coriolis component can be produced by vibrating the accelerometer, causing it to dither back and forth along a line perpendicular to the input axis of the accelerometer. Then, if the frame on which the accelerometer is mounted is rotating, the Coriolis acceleration component of the accelerometer's output signal will be increased proportional to the dither velocity. If the dither amplitude and frequency are held constant, then the Coriolis acceleration is proportional to the rotation rate of the frame.

The linear acceleration component and the rotational component representing the Coriolis acceleration may be readily separated by using two accelerometers mounted in back-to-back relationship to each other and processing their out put signals by sum and difference techniques. In U.S. Pat. No. 4,510,802, assigned to the assignee of this invention, two accelerometers are mounted upon a parallelogram with their input axes pointing in opposite directions. An electromagnetic D'Arsonval coil is mounted on one side of the parallelogram structure and is energized with a periodically varying current to vibrate the accelerometers back and forth in a direction substantially normal to their sensitive or input axis. The coil causes the parallelogram structure to vibrate, dithering the accelerometers back and forth. By taking the difference between the two accelerometer outputs, the linear components of acceleration are summed. By taking the sum of the two outputs, the linear components cancel and only the Coriolis or rotational components remain.

U.S. Pat. No. 4,509,801, commonly assigned to the assignee of this invention, describes the processing of the output signals of two accelerometers mounted for periodic, dithering motion to obtain the rotational rate signal Q and the force or acceleration signal F representing the change in velocity, i.e. acceleration of the moving body, along the Z axis. U.S. Pat. No. 4,510,802, commonly assigned to the assignee of this invention, describes a control pulse generator, which generates and applies a sinusoidal signal of a frequency $\omega$ to the D'Arsonval coil to vibrate the parallelogram structure and thus the first and second accelerometer structures mounted thereon, with a dithering motion of the same frequency $\omega$. The accelerometer output signals are applied to a processing circuit, which sums the accelerometer output signals to reinforce the linear components indicative of acceleration. The linear components are integrated over the time period T of the frequency $\omega$ corresponding to the dither frequency to provide the force signal F, which represents the change in velocity, i.e. acceleration, along the Z axis. The accelerometer output signals are also summed, whereby their linear components cancel and their Coriolis components are reinforced to provide a signal indicative of frame rotation. That difference signal is multiplied by a zero mean periodic function sgnc ωt. The resulting signal is integrated over a period T of the frequency ω by a sample and hold circuit to provide the signal Ω representing the rate of rotation of the frame.

The D'Arsonval coil is driven by a sinusoidal signal of the same frequency ω which corresponded to the period T in which the linear acceleration and Coriolis component signals were integrated. In particular, the pulse generator applies a series of pulses at the frequency ω to a sine wave generator, which produces the substantially sinusoidal voltage signal to be applied to the D'Arsonval coil. A pair of pick-off coils produce a feedback signal indicative of the motion imparted to the accelerometers. That feedback signal is summed with the input sinusoidal voltage by a summing junction, whose output is applied to a high gain amplifier the output of that amplifier in turn is applied to the D'Arsonval type drive coil. The torque output of the D'Arsonval coil interacts with the dynamics of the parallelogram structure to produce the vibrating or dither motion. In accordance with well known servo theory, the gain of the amplifier is set high so that the voltage applied to the summing junction and the feedback voltage are forced to be substantially equal and the motion of the mechanism will substantially follow the drive voltage applied to the summing junction.

U.S. Pat. No. 4,881,408 describes the use of vibrating beam force transducers in accelerometers. In U.S. Pat. No. 4,372,173, the force transducer takes the form of a double-ended tuning fork fabricated from crystalline quartz. The transducer comprises a pair of side-by-side beams which are connected to common mounting structures at their ends. Electrodes are deposited on the beams and a drive circuit applies a periodic voltage signal to the electrodes causing the beams to vibrate toward and away from one another, 180 degrees out of phase. In effect, the drive circuit and beams form an oscillator with the beams playing the role of a frequency controlled crystal, i.e. the mechanical resonance of the beams controls the oscillation frequency. The vibrating beams are made of crystalline quartz, which has piezoelectric properties. Application of periodic drive voltages to such beams cause them to vibrate toward and away from one another, 180 degrees out of phase. When the beams are subjected to accelerating forces, the frequency of the mechanical resonance of the beams changes, which results in a corresponding change in the frequency of the drive signal. When subjected to acceleration forces that cause the beams to be placed in tension, the resonance frequency of the beams and thus the frequency of the drive signal increases. Conversely, if the beams are placed in a compression by the acceleration forces, the resonance frequency of the beams and the frequency of the drive signal is decreased.

Above referenced U.S. Pat. No. 5,005,413 describes accelerometers using vibrating force transducers require materials with low internal damping, to achieve high Q values that result in low drive power, low self-heating and insensitivity to electronic component variations. Transducer materials for high-accuracy instruments also require extreme mechanical stability over extended cycles at high stress levels. Crystalline silicon posses high Q values, and with the advent of low cost, micromachined mechanical structures fabricated from crystalline silicon, it is practical and desirable to create vibrating beams from a silicon substrate. Commonly assigned U.S. Pat. No. 4,912,990 describes a vibrating beam structure fabricated from crystalline silicon and including an electric circuit for applying a drive signal or current along a current path that extends in a first direction along a first beam and in a second, opposite direction along a second beam parallel to the first. A magnetic field is generated that intersects substantially perpendicular the conductive path, whereby the first and second beams are caused to vibrate towards and away from one another, 180 degrees out of phase.

Digital techniques employ stable, high frequency crystal clocks to measure a frequency change as an indication of acceleration forces applied to such vibrating beam accelerometers. To ensure precise integration or cosine demodulation, a crystal clock is used to set precisely the frequency of the dither drive signal. Outputs from two accelerometers are fed into counters to be compared to a reference clock signal produced by the crystal clock. A microprocessor reads the counters and processes the data to provide a force signal F and a rotational signal. The main advantage of digital processing is the ability to demodulate with extreme precision. The short term stability of the reference crystal clock allows the half cycle time basis to be precisely equal. Thus a constant input to the cosine demodulator is chopped up into equal, positive half cycle and negative half cycle values, whose sum is exactly zero.

In an illustrative embodiment, the two accelerometers signals are counted in their respective counters over 100 Hz period (corresponding to a 100 Hz of the dither frequency ω) and are sampled at a 400 Hz data rate corresponding to each quarter cycle of the dither motion. The two accumulated counts are subtracted to form the force signal F. Since the counters act as an integrator, the acceleration signal is changed directly to a velocity signal. Taking the difference of the acceleration signals tends to reject all Coriolis signals as does the counter integration and locked period data sampling.

The Coriolis signals are detected by a cosine demodulation. The cosine demodulated signals from the first and second accelerometers are summed to produce the Δθ signal. Again, the counters integrate the rate data to produce an angle change. The sum also eliminates any linear acceleration and the demodulation cancels any bias source including bias operating frequency and accelerometer bias. The accelerometer temperature is used in a polynomial model to provide compensation for all the coefficients used to convert the frequency counts into output units. Thus, the scale factor, bias and misalignment of the sensor axes are corrected over the entire temperature range.

The demodulation of the frequency sample is straightforward once the data is gathered each quarter cycle. The cosine demodulation is simply the difference between the appropriate half cycles. The linear acceleration is the sum of all samples.

The state of the art in micromachined rate and acceleration sensors is represented by U.S. Pat. No. 5,341,682 which is commonly assigned to the assignee of the present invention and incorporated herein by reference. The rate of rotation of a moving body about an axis may be determined by mounting an accelerometer on a frame and dithering it, with the accelerometer's sensitive axis and the direction of motion of the frame both normal to the rate axis about which rotation is to be measured. A Coriolis acceleration is the measure of the acceleration developed while the body is moving in a straight line and the frame upon which it is mounted rotates about the rate axis. The amplitude of the Coriolis component can be produced by vibrating or dithering the accelerometer, causing it to dither back and forth along a line perpendicular to the input axis of the accelerometer. When the frame upon which the accelerometer is mounted is rotated, the Coriolis acceleration component of the accelerometer's output signal increases in proportion to the dither velocity.

The linear acceleration component and the rotational component representing the Coriolis acceleration may be readily separated by using two accelerometers mounted in back-to-back relationship to each other and processing their output signals by sum and difference techniques as described in U.S. Pat. No. 4,590,801, which is commonly assigned to the assignee of the present invention and incorporated herein by reference.

Rate and acceleration sensors, for example, U.S. Pat. No. 5,341,682, are comprised of two accelerometers aligned in a single plane such that the input or sensitive axes of the two accelerometers are parallel and the output or hinge axes of the two accelerometers are parallel. The two accelerometers are vibrated or dithered at a predetermined frequency along a dither axis parallel to the hinge axes. The two accelerometers tend to vibrate at slightly different frequencies due to slight mass mismatch. Even if driven by a drive signal of common frequency, the accelerometer motions tend to be out of phase with each other. A link is connected to each of the two accelerometers whereby motion imparted to one accelerometer results in like but opposite motion imparted to the other accelerometer. Thus, the dithering motion imparted to one accelerometer is ideally of the exact same frequency and precisely 180 degrees out of phase with that applied to the other accelerometer.

The link provides an interconnect between the two accelerometers which is stiff in the dither axis such that the motion imparted to one accelerometer is effectively transmitted to the other accelerometer and both accelerometers ideally dither at the same frequency and precisely 180 degrees out of phase. The link is pivotally fixed to the frame by a pivot flexure. The link is further connected to each of the two accelerometers by flexures. The link is typically formed in a complex asymmetric shape. The complexity of the link is driven by practical considerations involved in adapting the link to accommodate both the pivot flexure and the two link-to-accelerometer flexures. The link's complex asymmetric shape provides adequate clearance between the link and the frame for the pivot flexure. The link's shape also provides adequate clearance between the link and each accelerometer to provide the precise flexure length to ensure that the flexures exhibit a predetermined mix of simple arc bending and "S-bend" motion and to ensure that any motion imparted to one accelerometer by the flexures is imparted to the other accelerometer as a sinusoidal function without introducing a higher order harmonic into the translation motion.

Although the existing device functions for the purposes intended, its exact behavior is difficult to predict and/or model analytically. For example, the complex shape of prior links results in spring rates which are asymmetrical and a shape which is difficult to solve analytically. Additionally, constructing the shape previously taught results in flexures whose thicknesses and hence vibration properties are difficult to control.

SUMMARY OF THE INVENTION

The present invention provides a linkage between accelerometers in a micromachined rate and acceleration sensor which is relatively simple to solve analytically and results in flexures whose thicknesses are relatively insensitive to process variations. For example, according to one aspect of the present invention, the link shape can be solved using classical mechanical equations. According to another aspect of the invention, the present invention provides a shape which is relatively insensitive to process variations by providing a relatively simple shape having a symmetrical configuration.

According to one aspect of the present invention, the present invention provides a simple symmetrically shaped link having sufficient mechanical stiffness in the to effectively transmit motion imparted to one accelerometer to the other accelerometer such that both accelerometers dither at the same frequency and precisely 180 degrees out of phase.

According to another aspect of the present invention, the present invention provides a simple symmetrical link which provides adequate clearance between the link and each accelerometer for flexures having a length which ensures that the flexures exhibit a predetermined mix of simple arc bending and "S-bend" motion and which ensures that any motion imparted to one accelerometer by the flexures is imparted to the other accelerometer as a sinusoidal function without introducing a higher order harmonic into the translation motion.

According to yet another aspect of the present invention, the present invention provides a simple symmetrical link having reduced sensitivity to vibration in the dither cross-axis by providing, for example, a simplified columnar shaped. According to still another aspect of the invention, the present invention provides a simple symmetrical link having reduced sensitivity to cross-axis vibration by providing, for example, a link having a columnar shape in the dither cross-axis.

BRIEF DESCRIPTION OF THE DRAWINGS

FIG. 2 is a plan view of an 'X' shaped link according to one embodiment of the present invention;

FIG. 3 is a plan view of a modified 'X' shaped link according to one embodiment of the present invention;

FIG. 4 is a plan view of a link having a "dog leg" shape according to one embodiment of the present invention;

FIG. 6 is a plan view of a symmetric and mass reduced 'U' shaped link according to one embodiment of the present invention.

DETAILED DESCRIPTION OF THE PREFERRED EMBODIMENT(S)

Figure 1:
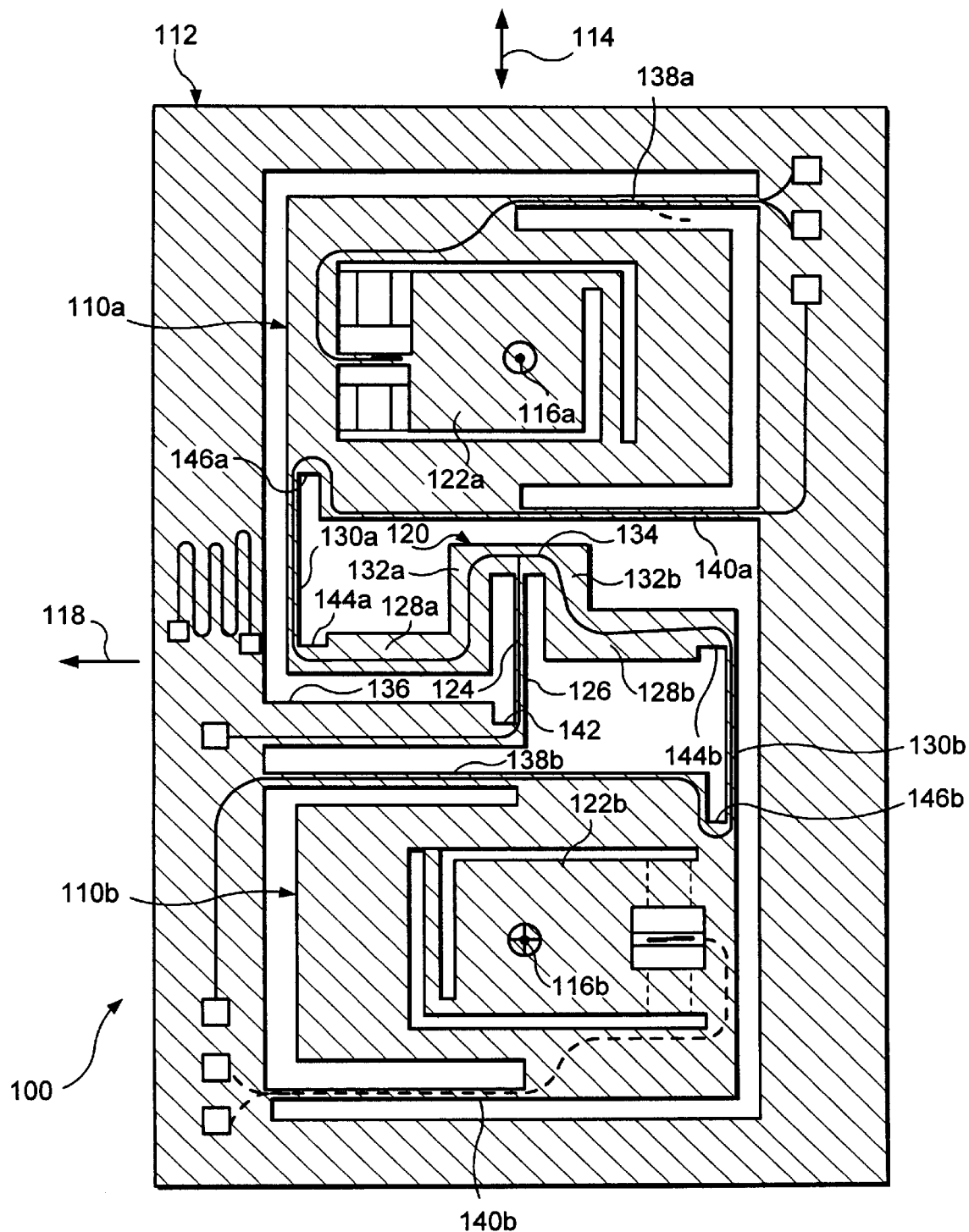
FIG. 1 is a plan view of a link of the prior art.

FIG. 1 illustrates one embodiment of a link of the prior art. In FIG. 1 the link is formed between accelerometers in a rate sensor. FIG. 1 is a plan view showing the link. In rate and acceleration sensor 100 accelerometers 110$a$, 110$b$ are suspended from frame 112 such that a dither vibration applied to accelerometers 110$a$, 110$b$ causes both accelerometers 110$a$, 110$b$ to dither or vibrate in the dither axis 114 normal to input or sensitive axes 110$a$, 110$b$ and normal to rate axis 118. Link 120 mechanically interconnects first and second accelerometers 110$a$, 110$b$ such that any motion, including dithering motion and extraneous motions, applied to one accelerometer 110 is also applied in precisely equal and opposite fashion to the other accelerometer 110. In this fashion, the outputs of accelerometers 110$a$, 110$b$ may be processed by sum and difference techniques to provide a force signal F and a rotational signal $\Omega$, as well as to cancel out error signals. Without link 120, accelerometers 110$a$, 110$b$ would operate at different frequencies due to mass mismatch between proof masses 122$a$122$b$. If driven at a common frequency, accelerometers 110$a$, 110$b$ would, without link 120, operate out of phase with each other or at a phase angle other than 180 degrees.

Link 120 is a complex asymmetrical member formed in the substrate material. Link 120 resembles a lever pivotally mounted about a pivot point 124 provided by a pivot flexure 126. Link 120 includes first and second lever arms 128*a*, 128*b* extending in opposite directions from pivot point 124. First lever arm 128*a* is connected by a first dither axis flexure 130*a* to the free moving end of accelerometer 110*a*. Similarly, second lever arm 128*b* is connected by a second dither axis flexure 130*b* to the free moving end of accelerometer 110*b*. To accommodate pivot flexure 126, link 120 is an asymmetrical configuration comprised of a pair of parallel members 132*a*, 132*b* and interconnecting member 134. The lengths of parallel members 132*a*, 132*b* extending along the sensor's dither axis 114 differ as between parallel members 132*a*, 132*b*. Parallel members 132*a*, 132*b* interconnect pivot arms 128*a*, 128*b* to brace 134 which is connected to pivot flexure 126. In turn, pivot flexure 126 is mounted along a center axis of frame 112 by a support member 136 formed in the substrate material which is, in turn, affixed to frame 112.

The configuration and manner of mounting link 120 are effected to permit link 120 to effectively pivot about pivot point 124 disposed at a point along the length of the pivot flexure 126 selected to intersect an axis passing through lever arms 128*a*, 128*b*. The length of pivot flexure 126 is selected to impart a simple bending thereto, whereby that portion of pivot flexure 126 extending from pivot point 124 to the point of interconnection to link 120 is permitted to flex about pivot point 124 while the remaining portion of pivot flexure 126 between pivot point 124 and support member 136 flexes in a smooth arc. In this fashion, the end points of link 120 are disposed a radial distance from pivot point 124 substantially equal to the effective radius of rotation provide by the isolation flexures 138*a*, 138*b*, 140*a*, 140*b* for accelerometers 110*a*, 110*b*.

Dither axis flexures 130*a*, 130*b*, which mechanically interconnect link 120 with each of first and second accelerometers 110*a*, 110*b*, are dimensioned such that dither axis flexures 130*a*, 130*b* exhibit a predetermined ratio of simple arc bending and "S-bend" motion. For example, dither axis flexures 130*a*, 130*b* are dimensioned such that they exhibit 50 percent simple arc bending and percent "S-bend" motion. Portions of link 120 and accelerometers 110 are removed to provide cutouts 144*a*, 144*b* and 146*a*, 146*b*, respectively, such that the precise length of dither axis flexures 130*a*, 130*b* is determined to ensure that dither axis flexures 130*a*, 130*b* have characteristics of 50 percent simple motion and 50 percent "S-bend" motion. Such characteristics ensure that any motion imparted by dither axis flexures 130 to one accelerometer 110 is imparted as a sinusoidal function to the other accelerometer 110 without introducing a higher order harmonic into the translation motion. Without such dither axis flexures 130 and link 120, the dither motion as well as other extraneous motion applied to frame 112 could impose high order harmonic motion to accelerometers 110 whose outputs upon demodulation would bear an undesired bias or offset signal.

As noted above and in FIG. 1, link 120 of the prior art is configured in a complex asymmetrical shape to accommodate both pivot flexure 126 and dither axis flexures 130*a*, 130*b* whereby each flexure is capable of exhibiting the desired bending characteristics. The complex shape of link 120 has, for example, asymmetrical spring rates arising from, at least, parallel members 132*a*, 132*b* having different longitudinal dimensions.

In another example, link 120 of the prior art presents, for example, complex analytical characteristics arising from, at least, parallel members 132*a*, 132*b* having different longitudinal dimensions; first and lo second lever arms 128*a*, 128*b* having cutouts 144*a*, 144*b* for accommodating dither axis flexures 130*a*, 130*b*; and a complex asymmetrical shape intended to accommodate both pivot flexure 126 and dither axis flexures 130*a*, 130*b*.

In yet another example, link 120 has a relatively low cross-axis or rate axis vibration sensitivity on the order of 2 to 4 times the dither frequency arising from, at least, the asymmetrical shape of link 120; the mass of link 120; and the cantilevered and one-sided support structure provided by pivot flexure 126.

FIG. 2 shows a plan view of one embodiment of a rate and acceleration sensor 200 including a link 210 according to one embodiment of the present invention. Link 210 comprises a simple rectangular beam 212 which is formed in the substrate material and in the two epitaxial layers 214 formed on opposing parallel surfaces of the substrate. Rectangular beam 212 is inherently balanced and axes-symmetric about its geometric center which is also the center of mass of rectangular beam 212. Thus, the simple rectangular shape of rectangular beam 212 may be analyzed using classical methods commonly known to those of skill in the art. Link 210, including rectangular beam 212, minimizes mass while providing stiffness equal to or greater than that of the complex asymmetrical shape of the prior art.

In one preferred embodiment, a rectangular beam 212 is formed in an axis which is parallel to the rate axis 216 and normal to dither axis 218. Link 210 is mechanically connected to accelerometers 220 by dither axis flexures 222 such that the geometric center of rectangular beam 212 is intermediate between dither axis flexures 222. Link 210 further comprises eight epitaxial struts or legs 224 (four shown) which form an 'X' shape. The intersection of 'X' struts 224 is essentially centered at the geometric center of rectangular beam 212. The ends of 'X' struts 224 opposite the intersection point connect to either of two solid cantilevered frame members 226 formed in the substrate material. A first four epitaxial struts 224 are formed in first epitaxial layer 214 and a second four epitaxial struts 224 (not shown) are formed in second epitaxial layer 214.

The intersection point of 'X' struts 224 is both the geometric center and the center of mass of 'X' struts 224 by virtue of the symmetric 'X' shape of 'X' struts 224. Thus, 'X' struts 224 are inherently balanced and axessymmetric about the intersection point of 'X' struts 224. In one preferred embodiment, both the geometric center and the center of mass of link 210 are located essentially at the geometric center and center of mass of rectangular beam 212, which is also the geometric center and center of mass of 'X' struts 224. Link 210, including rectangular beam 212 and 'X' struts 224, is thus inherently balanced and axes-symmetric about its own geometric center and center of mass by virtue of the location of 'X' struts 224 relative to rectangular beam 212.

In one preferred embodiment, struts 224 are formed at 45 degree angles to rate and dither axes 216, 218. Solid dither axis flexures 222 connect the ends of link 210 to the free moving ends of accelerometer blocks 220. Link 210, including rectangular beam 212 and epitaxial struts 224, provides reduced sensitivity to vibration in the dither cross-axis, having a cross-axis vibration sensitivity on the order of 4 or more times the dither frequency. Link 210 in combination with dither axis flexures 222 provides a linkage between accelerometer blocks 220 which pivots about the geometric center of rectangular beam 212 whereby the motion of one accelerometer block 220, including dither motion, is transmitted to the other accelerometer block 220 as a sinusoidal function without introducing a higher order harmonic into the translation motion. Thus, the dithering motion imparted to one accelerometer is of the exact same frequency and precisely 180 degrees out of phase with that applied to the other accelerometer.

Link 210, including epitaxial struts 224, can be fabricated in double-sided epitaxial silicon wafers by conventional wet etching processing using a back-biased voltage as an etch stop. For example, wet etching may be accomplished using a potassium hydroxide (KOH) based etchant known to those of skill in the art that takes advantage of the orientation-dependent properties of silicon to etch specific shapes in silicon, also known as KOH processing. Link 210, including rectangular beam 212 and epitaxial struts 224, is insensitive to process variations in any of the widths of dither axis flexures 222; the etch times for forming link 210, including rectangular beam 212 and struts 224; or the final width of struts 224. For a detailed discussion of KOH etching, reactive ion etching and other etching techniques, reference is made to the following publications, which are incorporated herein by reference: *VLSI Fabrication Principles* by Sorab K. Ghandhi and *Silicon Processing for the VLSI Era*, volume 1: *Process Technology* by S. Wolf and R. J. Tauber.

ALTERNATIVE EMBODIMENTS

One alternative embodiment of the present invention is shown in FIG. 3. Link 310 comprises a rectangular beams 312 formed in the substrate and in the two epitaxial layers 314 formed on opposing surfaces of the substrate. Four 'X' struts or legs 316 of the configuration shown in FIG. 3 are formed in a first epitaxial layer 314. Two perpendicular struts or legs 318 are formed in the opposing epitaxial layer 314 along an axis parallel to the dither axis 320. Thus, link 310 comprises solid rectangular beam 312 formed in the substrate material and in two opposing epitaxial layers 314; four 'X' struts 316 formed in one epitaxial layer 314; and two struts 318 formed in the opposing epitaxial layer 314 essentially perpendicular to rectangular beam 312 at the approximate geometric center of rectangular beam 312. The ends of perpendicular struts 318 connect to rectangular beam 312 and to either of two solid cantilevered frame members 322 formed in the substrate material. As in the configuration of FIG. 2, the intersecting ends of 'X' struts 316 intersect rectangular beam 312 at the approximate geometric center of rectangular beam 312 and the ends of 'X' struts 316 opposite the intersection point connect to either of two solid cantilevered frame members 322. As in the configuration of FIG. 2, the geometric center and center of mass of rectangular beam 312 is also the geometric center and center of mass of link 310 about which link 310 is inherently balanced and axes-symmetric.

By providing 'X' struts 316 and perpendicular struts 318 which do not overlay one another in a plan view, link 310 may be fabricated using a combination of KOH etching and reactive ion etching. Perpendicular struts 318 are fabricated using KOH etching and back-biasing to ensure the integrity of epitaxial layer 314. Opposing epitaxial layers 314 are cleared from one another using KOH etching. Perpendicular struts 318 are then defined using a reactive ion etching operation on the substrate side of epitaxial layer 314 which improves strut definition, allows for the fabrication of thinner struts, and provides a link which pivots about the approximate geometric center of rectangular beam 312. Link 310, including 'X' struts 316 and perpendicular struts 318, increases stiffness over the configuration of FIG. 2 while providing the same relatively reduced sensitivity to vibration in the dither cross-axis. Link 310, including rectangular beam 312 and epitaxial struts 316, 318, is insensitive to process variations in any of the widths of flexures 322; the etch times for forming link 310, including rectangular beam 312, 'X' struts 316 and perpendicular struts 318; or the final width of either 'X' struts 316 or perpendicular struts 318.

FIG. 4 shows another alternative embodiment of the present invention. Link 410 comprises solid rectangular beam 412 formed in the substrate material and in the two epitaxial layers 414 formed on opposing surfaces of the substrate. Four struts or legs 416 are formed perpendicular to rectangular beam 412 at the approximate geometric center of rectangular beam 412, two formed in each opposing epitaxial layer 414. In one preferred embodiment, a first pair of perpendicular struts 416 formed in a first epitaxial layer 414 overlie the second pair of struts 416 formed in the second epitaxial layer 414 formed on the opposing surface of the substrate. In one preferred embodiment, each perpendicular strut 416 is formed having a jog or "dog leg." The "dog leg" is formed such that the two longitudinal portions 418, 420 are slightly offset from one another. In other words, the "dog leg" 422 formed between longitudinal portions 418, 420 has a finite length longer than the combined widths of longitudinal portions 418, 420. The "dog leg" aids in clearing the bulk silicon from between overlying struts 416. In one preferred embodiment, the "dog leg" is located at the approximate geometric center of perpendicular strut 416. As in the configuration of FIG. 2, the geometric center and center of mass of rectangular beam 412 is also the geometric center and center of mass of link 410 about which link 410 is inherently balanced and axes-symmetric. The configuration of FIG. 4 produces a link which pivots about the approximate geometric mid-point of rectangular beam 412 and provides the simplicity of analysis associated with the configurations of FIGS. 2 and 3, above.

Figure 5:
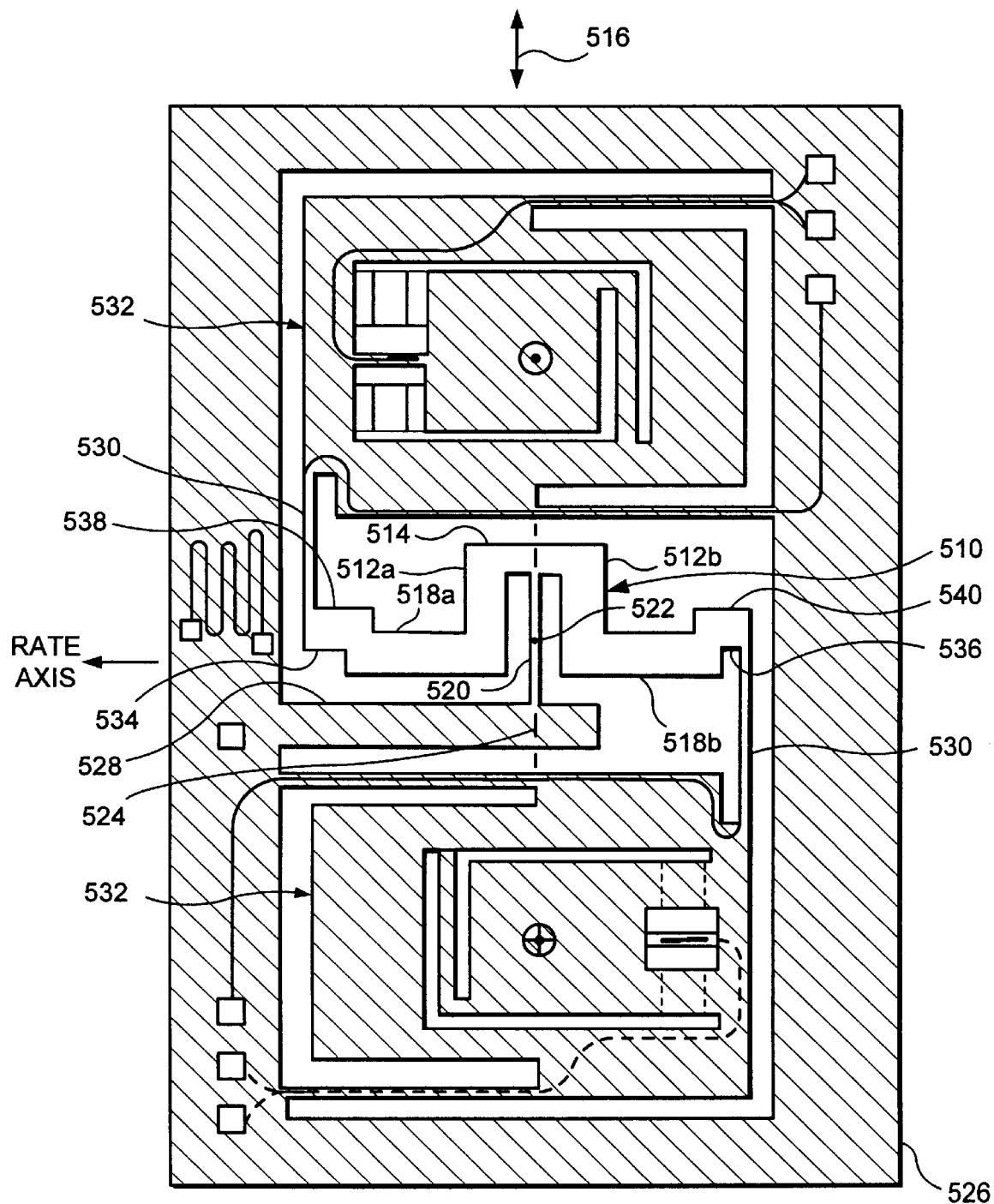
FIG. 5 is a plan view of a symmetric 'U' shaped link according to one embodiment of the present invention.

FIG. 5 shows another alternative link configuration. The link configuration of FIG. 5 is a symmetrical 'U' shape providing an analytically simplified configuration. Link 510 comprises a pair of parallel members 512a, 512b and interconnecting member 514. The lengths of parallel members 512a, 512b extending along the sensor's dither axis 516 are substantially equal. Parallel members 512a, 512b interconnect pivot arms 518a, 518b to interconnecting member 514 which is connected to pivot flexure 520. Link 510 resembles a lever pivotally mounted about a pivot point 522 provided by pivot flexure 520.

Thus, link 510 is inherently balanced and axes-symmetric about an axis 524 parallel to the longitudinal axes of parallel members 512 and passing through the geometric center of interconnecting member 514. In one preferred embodiment, pivot flexure 520, including pivot point 522, is centered on axis 524. Thus, link 510 is inherently balanced and axes-symmetric about pivot flexure 520 and about pivot point 522.

Pivot flexure 520, and thus pivot point 522, is mounted along a center axis of frame 526 by a support member 528 which is, in turn, affixed to frame 526. The 'U' shape of link 510 accommodates both pivot flexure 520 and interconnecting dither axis flexures 530. First ends of flexures 530 are fixed to the ends of pivot arms 518 and second ends of flexures 530 are fixed to the moving ends of accelerometer blocks 532. Thus, link 510 is interconnected to each of two accelerometer blocks 532 by flexures 530. Link 510 in combination with interconnecting dither flexures 530 provides a linkage between accelerometer blocks 532 which pivots about pivot point 522. In a preferred embodiment, link 510 pivots about pivot point 522 disposed intermediate between interconnecting dither flexures 530.

Portions of link 510 are removed to provide cutouts 534 and 536 and portions are retained to form extensions 538, 540 such that the precise length of interconnecting dither axis flexures 530 is determined to ensure that flexures 530 have characteristics of 50 percent simple motion and 50 percent "S-bend" motion. As noted above, such characteristics ensure that any motion imparted by dither axis flexures 530 to one accelerometer block 532 is imparted as a sinusoidal function to the other accelerometer block 532 without introducing a higher order harmonic into the translation motion. In a preferred embodiment, the dimensions of cutouts 534, 536 and extensions 538, 540 are chosen such that link 510 is inherently balanced and axes-symmetric about pivot flexure 520 and about pivot point 522.

FIG. 6 shows another alternative link configuration comprising a mass reduced 'U' shaped link 610. The link configuration of FIG. 6 is another symmetrical 'U' shape which provides an analytically simplified configuration. Link 610 comprises a pair of parallel members 612a, 612b and interconnecting member 614. The lengths of parallel members 612a, 612b extending along the sensor's dither axis 616 are substantially equal. Portions of parallel members 612a, 612b are removed to form one or more cavities or through holes 618 which lighten or mass reduce link 610. Parallel members 612a, 612b interconnect pivot arms 620a, 620b to brace 614 which is connected to pivot flexure 622. In one preferred embodiment, four through holes 618 are formed in link 610, two in each of parallel members 612a, 612b. In turn, pivot flexure 622 is mounted along a center axis of frame 624 by a support member 626 which is, in turn, affixed to frame 622. The 'U' shape of link 610 accommodates both pivot flexure 622 and interconnecting dither axis flexures 628.

First ends of interconnecting dither axis flexures 628 are fixed to the ends of pivot arms 620 and second ends of flexures 628 are fixed to the moving ends of accelerometer blocks 630. Thus, link 610 is interconnected to each of two accelerometer blocks 630 by flexures 628. Portions of link 610 are removed to provide cutouts 632 and 634 and portions are retained to form extensions 636, 638 such that the precise length of dither axis flexures 628 is determined to ensure that dither axis flexures 628 have characteristics of 50 percent simple motion and 50 percent "S-bend" motion.

Thus, link 610 is inherently balanced and axes-symmetric about an axis 640 parallel to the longitudinal axes of parallel members 612 and passing through the geometric center of interconnecting member 614. In one preferred embodiment, pivot flexure 622, including a pivot point 642, is centered on axis 640. Thus, link 610 is inherently balanced and axes-symmetric about pivot flexure 622 and about pivot point 642.

Figure 7:
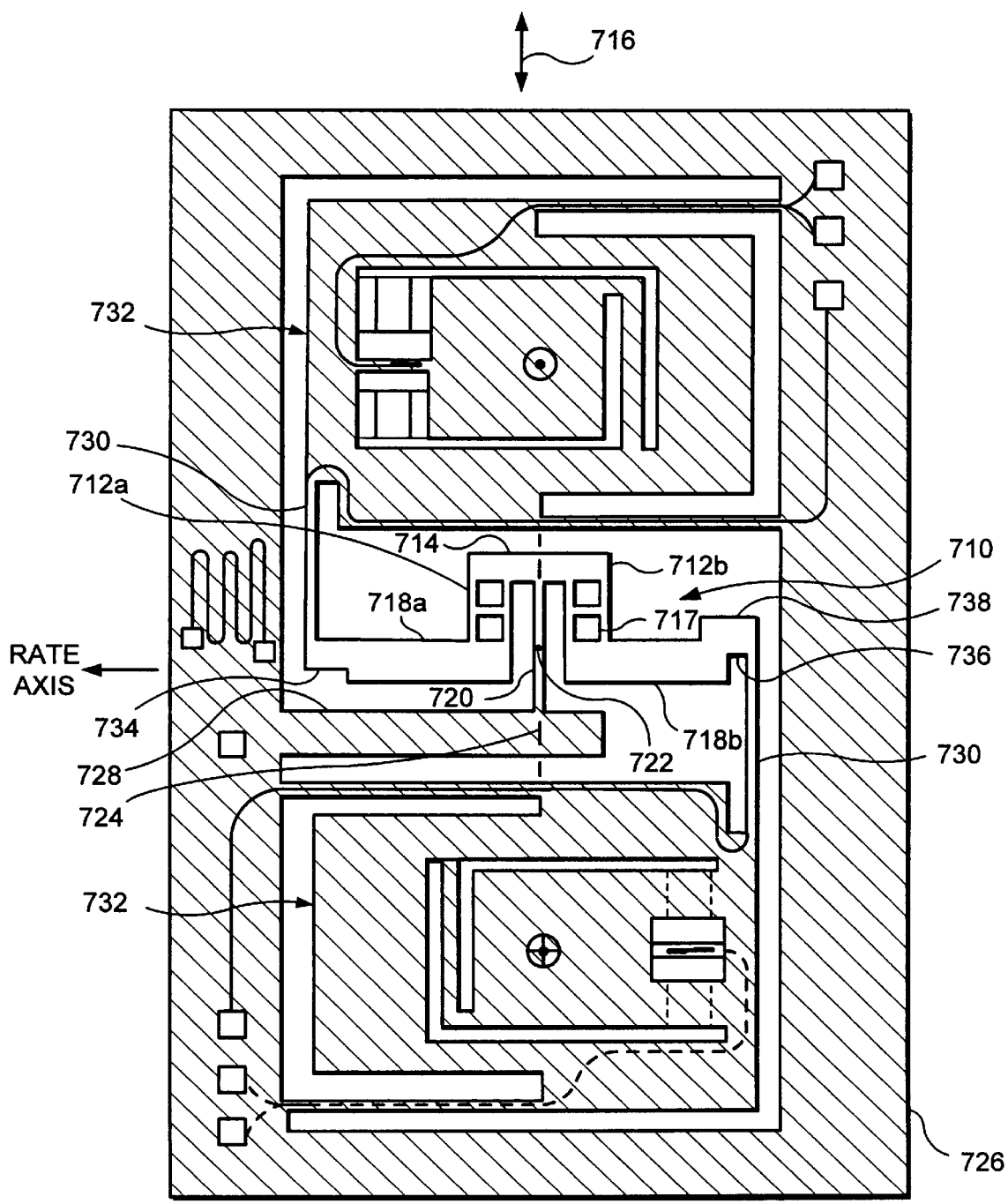
FIG. 7 is a plan view of a mass reduced 'U' shaped link according to another embodiment of the present invention.

FIG. 7 shows yet another alternative link configuration comprising a mass reduced 'U' shaped link 710. The link configuration of FIG. 7 is another 'U' lo shape which provides an analytically simplified configuration. Link 710 comprises a pair of parallel members 712a, 712b and interconnecting member 714. The lengths of parallel members 712a, 712b extending along the sensor's dither axis 716 are substantially equal. In one preferred embodiment, portions of parallel members 712a, 712b are removed to form one or more cavities or through holes 717 which lighten or mass reduce link 710. Parallel members 712a, 712b interconnect pivot arms 718a, 718b to interconnecting member 714 which is connected to pivot flexure 720. Link 710 resembles a lever pivotally mounted about a pivot point 722 provided by pivot flexure 720. Thus, link 710 is essentially balanced and axes-symmetric about an axis 724 parallel to the longitudinal axes of parallel members 712 and passing through the geometric center of interconnecting member 714. In one preferred embodiment, pivot flexure 720, including pivot point 722, is centered on axis 724. Thus, link 710 is essentially balanced and axes-symmetric about pivot flexure 720 and about pivot point 722.

Pivot flexure 720, and thus pivot point 722, is mounted along a center axis of frame 726 by a support member 728 which is, in turn, affixed to frame 726. The 'U' shape of link 710 accommodates both pivot flexure 720 and interconnecting dither axis flexures 730. First ends of flexures 730 are fixed to the ends of pivot arms 718 and second ends of flexures 730 are fixed to the moving ends of accelerometer blocks 732. Thus, link 710 is interconnected to each of two accelerometer blocks 732 by flexures 730. Link 710 in combination with interconnecting dither flexures 730 provides a linkage between accelerometer blocks 732 which pivots about pivot point 722. In a preferred embodiment, link 710 pivots about pivot point 722 disposed intermediate between interconnecting dither flexures 730.

Portions of link 710 are removed to provide cutouts 734 and 736 and a portion is retained to form extension 738 such that the precise length of interconnecting dither axis flexures 730 is determined to ensure that flexures 730 have characteristics of 50 percent simple motion and 50 percent "S-bend" motion. As noted above, such characteristics ensure that any motion imparted by dither axis flexures 730 to one accelerometer block 732 is imparted as a sinusoidal function to the other accelerometer block 732 without introducing a higher order harmonic into the translation motion. In the embodiment of FIG. 7, the configurations of cutouts 734, 736 and extension 738 are dictated by practical considerations of space and minimum cross-section such that link 710 is prevented from being precisely balanced and axes-symmetric about pivot flexure 720 and about pivot point 722. In a preferred embodiment, the configurations of cutouts 734, 736 and extension 738 are chosen such that a minimum discrepancy in configuration exist between pivot arms 718a, 718b and link 710 is substantially balanced and axes-symmetric about pivot flexure 720 and about pivot point 722.

The foregoing is illustrative of the present invention and is not to be construed as limiting thereof. The invention is defined by the following claims, with equivalents of the claims to be included therein.

What is claimed is:

1. Apparatus for measuring the specific force and angular rotation rate of a moving body, comprising:
   a) a monolithic substrate having first and second substantially planar surfaces disposed substantially parallel to each other and first and second epitaxial layers adhered to said first and second parallel surfaces, respectively;
   b) a first accelerometer formed of said substrate and having a first force sensing axis for producing a first output signal indicative of the acceleration of the moving body along said first force sensing axis, said first accelerometer having a proof mass, a support frame, and at least one flexure connecting said proof mass to said support frame;
   c) a second accelerometer formed of said substrate and having a second force sensing axis for producing a second output signal indicative of the acceleration of the moving body along said second force sensing axis, said second accelerometer having a proof mass, a support frame, and at least one flexure connecting said proof mass to said support frame;

d) a dither frame formed of said substrate, said dither frame being of a rectangular configuration having first and third opposing members and second and fourth opposing members;

e) a first pair of S-bend flexures connected between said support frame of said first accelerometer and said dither frame, and a second pair of S-bend flexures connected between said support frame of said second accelerometer and said dither frame, said S-bend flexures being formed of said substrate for mounting said first and second accelerometers such that said first and second force sensing axes are both oriented at the same angle with respect to said first and second surfaces and such that said first and second accelerometers can be moved along a vibration axis perpendicular to each of said first and second sensing axes;

f) a link having first and second points connected respectively to said first and second accelerometers, a pivot point disposed intermediate between said first and second connected points, and support means for affixedly disposing said pivot point with respect to said dither frame to permit said link to pivot thereabout and, when one of said first and second accelerometers is moved, to impart a substantially equal and opposite motion to said other of said first and second accelerometers, said link having an essentially rectangular shape symmetrical about said pivot point;

g) a drive circuit coupled to each of said first and second accelerometers for imparting a dithering motion thereto of a predetermined frequency along said vibration axis; and h) said substrate having a rate axis perpendicular to each of said first and second force sensing axes and said vibration axis, whereby said first and second output signals have a Coriolis component indicative of the angular rotation of the moving body about said rate axis.

* * * * *